(No Model.)
F. SCHWEDTMANN.
JOINT OR SPLICE FOR ELECTRIC WIRES OR CABLES AND METHOD OF MAKING SAME.
No. 585,707. Patented July 6, 1897.
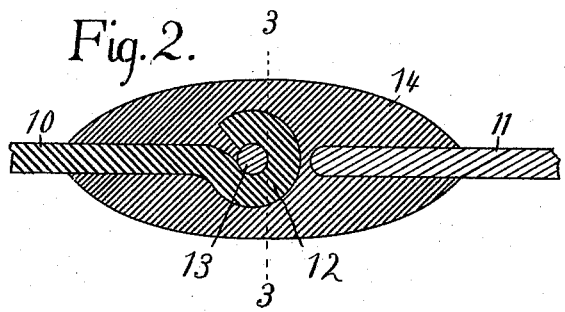
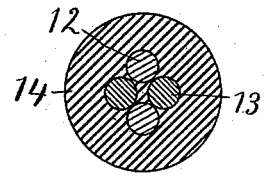
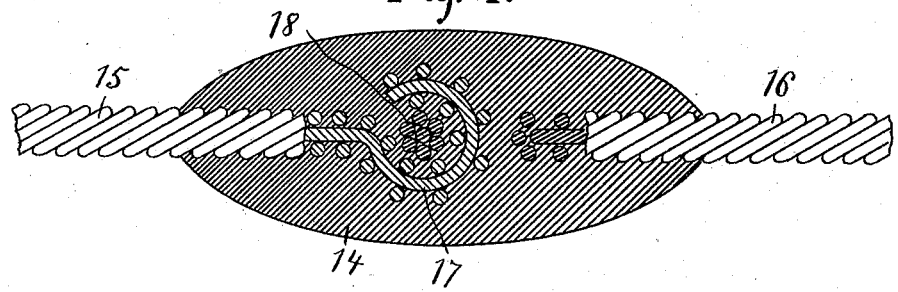
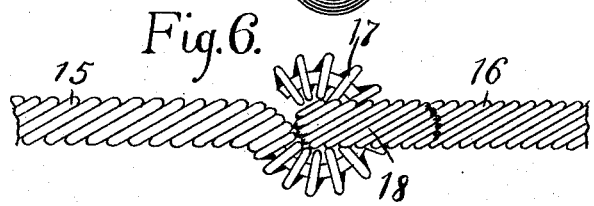
Witnesses
W. A. Alexander
E. E. Vennell
Inventor
F. Schwedtmann
By Attorneys
Fowler & Fowler

UNITED STATES PATENT OFFICE.

FERDINAND SCHWEDTMANN, OF ST. LOUIS, MISSOURI.

JOINT OR SPLICE FOR ELECTRIC WIRES OR CABLES AND METHOD OF MAKING SAME.

SPECIFICATION forming part of Letters Patent No. 585,707, dated July 6, 1897.

Application filed December 14, 1896. Serial No. 615,703. (No model.)

*To all whom it may concern:*

Be it known that I, FERDINAND SCHWEDTMANN, a citizen of the United States, residing at the city of St. Louis, in the State of Missouri, have invented a certain new and useful Joint or Splice for Electric Wires or Cables and Method of Making the Same, of which the following is such a full, clear, and exact description as will enable any one skilled in the art to which it appertains to make and use the same, reference being had to the accompanying drawings, forming part of this specification.

The object of my invention is to form a joint or splice for electric wires or cables which can be easily and quickly made, which will offer but little resistance to the flow of the current, and which will be neater and stronger than the ordinary line-splice.

My invention consists in the novel features described in the following specification and pointed out in the claims affixed hereto.

In the accompanying drawings, which illustrate a joint or splice made in accordance with my invention, Figure 1 is a side view of the completed joint. Fig. 2 is a longitudinal section. Fig. 3 is a cross-section on the line 3 3 of Fig. 2. Fig. 4 is a longitudinal section showing a cable instead of a single wire. Fig. 5 is a side view of the joint when partly completed; and Fig. 6 is a view similar to Fig. 5, but showing a cable instead of a single wire.

Like marks of reference refer to similar parts in the several views of the drawings.

10 and 11 are the two ends of the line-wire to be joined. On the ends 10 and 11, after they have been carefully cleaned of insulation, dirt, &c., are formed hooks 12 and 13, respectively. The hooks 12 and 13 are interlocked, as shown in Fig. 5, and then surrounded by a suitable mold, into which is poured melted solder or other suitable conducting-metal 14. As soon as the metal 14 cools the joint is complete.

In Fig. 4 is shown a joint connecting the two ends 15 and 16 of a cable formed by twisting a number of wires together. On the ends 15 and 16 are formed hooks 17 and 18, similar to the hooks 12 and 13, which are interlocked in the same manner and the metal 14 then molded around them. A joint can be formed in this manner very quickly, and when finished is very strong, neat in appearance, and offers practically no resistance to the passage of the current.

Having fully described my invention, what I claim as new, and desire to secure by Letters Patent of the United States, is—

1. The method of forming a joint for electric wires or cables which consists in forming hooks in the ends of the wire or cable, interlocking the said hooks, and then molding a conducting-metal around the said interlocked hooks.

2. A joint or splice for wires or cables, consisting of interlocking hooks on the ends of adjacent wires or cables and having metal cast therearound, so as to incase the same.

In testimony whereof I have hereunto set my hand and seal in the presence of the two subscribing witnesses.

FERDINAND SCHWEDTMANN. [L. S.]

Witnesses:
 W. A. ALEXANDER,
 E. E. VERNELL.